March 19, 1957 F. E. NOLD 2,785,578
COMBINATION DOUBLE HOOK-LINK AND CHAIN
Filed April 1, 1955
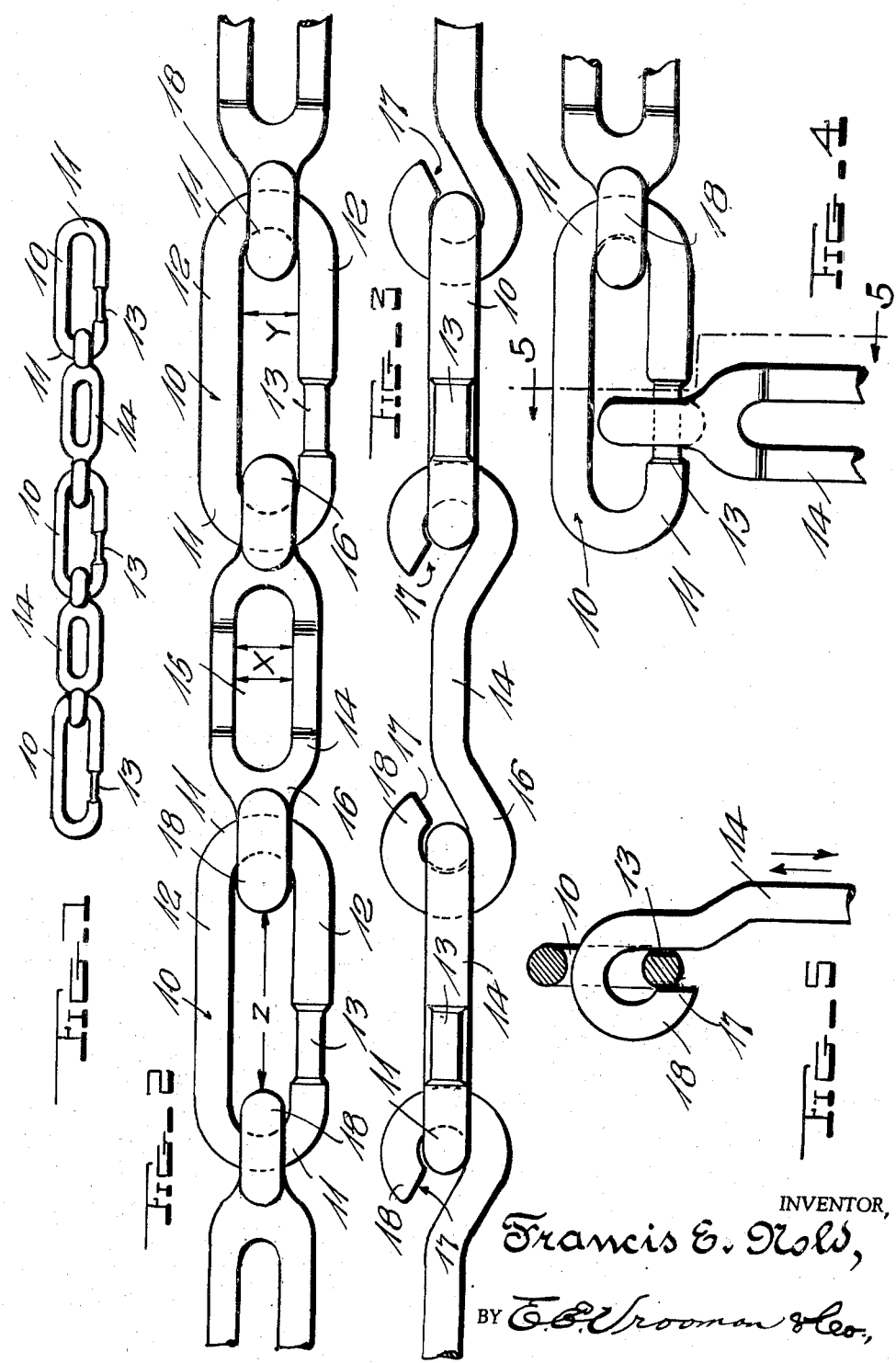
INVENTOR,
Francis E. Nold,
BY
ATTORNEYS

United States Patent Office 2,785,578
Patented Mar. 19, 1957

2,785,578

COMBINATION DOUBLE HOOK-LINK AND CHAIN

Francis E. Nold, Rome, N. Y.

Application April 1, 1955, Serial No. 498,650

3 Claims. (Cl. 74—245)

This invention relates to a chain construction and has special reference to a chain construction particularly adapted for use as a sprocket chain.

One important object of the invention is to provide a sprocket chain of novel construction whereby the chain may be changed in length by intervals equivalent to the distance between the centers of each of the chain links.

A second important object of the invention is to provide a chain of this class wherein each link will be a complete element by itself.

A third important object of the invention is to provide a chain of this class whereby any link in the chain may be engaged and disengaged from two adjacent links without distortion of any link.

With the above and other objects in view, the invention consists in general of certain novel details of construction and combinations of parts hereinafter fully described, illustrated in the accompanying drawings, and particularly claimed.

In the accompanying drawings, like characters of reference indicate like parts, in the several views and:

Fig. 1 is a side elevation of a chain constructed in accordance with this invention.

Fig. 2 is an enlarged view of a portion of Fig. 1.

Fig. 3 is a side elevation shown from the bottom of Fig. 2.

Fig. 4 is a view similar to a part of Fig. 3 but showing one link in position for dis-engagement from an adjacent link.

Fig. 5 is a section on the line 5—5 of Fig. 4.

In the construction of the invention there is provided a spaced series of links 10, each of which has a substantially semi-circular end 11 and a pair of parallel sides 12. One of the sides as thus formed has a reduced section 13 intermediate its length. Disposed between each pair of the links 10 is a link indicated in general at 14. This link has a body portion 15 and end portions 16. In this body portion and extending into the end portion 16 is a slot 17. These end portions are bent to provide hook-like portions 18 so that slot 17 is between the terminal end of each hook-like portion and the part 16. This slot 17 is slightly wider than the reduced portion 13 of the previously described links. The hook-like portions 18 are here shown as both opening outwardly from the main axis of the chain.

The slot of the links 14 as shown at x is equal in width to the distance y between the inner sides of the side portions of the links 10. Also when the several links are connected, the distances z between adjacent ends of a pair of links 14 are equal to the length of the slot of each link 14.

As will be observed from Fig. 5, the reduced portion 13 of each link 10 is such that the slot 17 may be engaged in the manner shown in Fig. 4 to admit the link 14 and thereby connect each link 10 to a spaced pair of links 14.

Now, it is thereby understood that when this chain runs over a sprocket wheel, the teeth of that sprocket wheel will, upon alternate lengths of that chain, engage and fit the openings in the links 14, and the space between adjacent ends of these links 14 as at z.

Moreover, it is obvious that the hook ends of the links 14 fit on the rounded ends of the links 10 so that there may be reasonable play between successive links.

There has obviously been provided a simple and efficient device, but it is also obvious that minor changes may be made in the form and construction of this invention without departing from the material principles thereof. It is not, therefore, desired to confine the invention in the exact form herein shown and described, but it is wished to include all such as properly come within the scope claimed.

What is claimed is:

1. In a sprocket chain construction, a series of spaced links having substantially semi-circular ends and spaced sides, and connecting links each interposed between a pair of the first-mentioned links, each of said connecting links having a central body portion provided with a longitudinal slot of the same width as the distance between the sides of the first-mentioned links, and of the same length, lying in a plane parallel to the aperture formed by the semi-circular ends and the spaced sides of said first mentioned link, said slots and said apertures forming successive means for engaging the teeth of a sprocket, each of the connecting links having hook-like ends projecting longitudinally from the body and engaging in the end portions of a pair of the first-mentioned links.

2. In a sprocket chain construction, a series of spaced links having substantially semi-circular ends and spaced sides, and connecting links each interposed between a pair of the first-mentioned links, each of said connecting links having a central body portion provided with a longitudinal slot of the same width as the distance between the sides of the first-mentioned links, and of the same length, lying in a plane parallel to the aperture formed by the semicircular ends and the spaced sides of said first mentioned link, said slots and said apertures forming successive means for engaging the teeth of a sprocket, each of the connecting links having hook-like ends projecting longitudinally from the body and engaging in the end portions of a pair of the first-mentioned links, each of the first-mentioned links having one of its sides reduced in cross-section to permit interlocking of a respective hook-like end of a connecting link with a first mentioned link.

3. In a sprocket chain construction, a series of spaced links having substantially semi-circular ends and spaced sides, and connecting links each interposed between a pair of the first-mentioned links, each of said connecting links having a central body portion provided with a longitudinal slot of the same width as the distance between the sides of the first-mentioned links, and of the same length, lying in a plane parallel to the aperture formed by the semi-circular ends and the spaced sides of said first mentioned link, said slots and said apertures forming successive means for engaging the teeth of a sprocket, each of the connecting links having hook-like ends projecting longitudinally from the body and engaging in the end portions of a pair of the first-mentioned links, each of the first-mentioned links having one of its sides reduced in cross-section to permit interlocking of a respective hook-like end of a connecting link with a first-mentioned link, the distance longitudinally of the chain between each pair of connecting links, when assembled, being equal to the lengths of the slots in the connecting links.

References Cited in the file of this patent

UNITED STATES PATENTS

| | | |
|---|---|---|
| 532,705 | Ritscher | Jan. 15, 1895 |
| 1,229,244 | Eckert | June 12, 1917 |

FOREIGN PATENTS

| | | |
|---|---|---|
| 16,323 | Australia | 1934 |
| 420,618 | Italy | Apr. 26, 1947 |